US010591712B2

(12) United States Patent
Zou et al.

(10) Patent No.: US 10,591,712 B2
(45) Date of Patent: *Mar. 17, 2020

(54) MICROSCOPE ARRANGEMENT HAVING A CONTROL DEVICE AND A PLURALITY OF MICROSCOPES, AND METHOD AND CONTROL DEVICE FOR OPERATING A PLURALITY OF MICROSCOPES

(71) Applicant: Leica Instruments (Singapore) Pte. Ltd., Singapore (SG)

(72) Inventors: Qingsong Zou, Singapore (SG); Anthony Lim, Singapore (SG); Apria Laksono, Singapore (SG); Michelle Li, Singapore (SG); Andreas Klopfer, Doren (AT); Vincent Vaccarelli, Getzville, NY (US)

(73) Assignee: LEICA INSTRUMENTS (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,029

(22) Filed: Jun. 25, 2019

(65) Prior Publication Data

US 2019/0310455 A1 Oct. 10, 2019

Related U.S. Application Data

(63) Continuation of application No. 15/351,499, filed on Nov. 15, 2016, now Pat. No. 10,371,934.

(51) Int. Cl.
*G06K 9/00* (2006.01)
*G02B 21/36* (2006.01)
(Continued)

(52) U.S. Cl.
CPC ........ *G02B 21/368* (2013.01); *G02B 21/365* (2013.01); *G02B 21/367* (2013.01);
(Continued)

(58) Field of Classification Search
CPC .. G02B 21/368; G02B 21/367; G02B 21/365; G09B 5/02; G09B 19/00; H04N 7/181
See application file for complete search history.

(56) References Cited

U.S. PATENT DOCUMENTS 6,396,941 B1 5/2002 Bacus et al.
2005/0218616 A1* 10/2005 Copeland ................ B62B 3/006
280/47.35
(Continued)

OTHER PUBLICATIONS

"Fluorescence Microscope Solutions." Microscope Digital Interactive Teaching System—Customer Service Stories—MSHOT, Jun. 2014, 5:22pm, www.m-shot.com/index.php?a=show&m=Anlie&id=93. (Year: 2014) (Year: 2014).*

*Primary Examiner* — Howard D Brown, Jr.
(74) *Attorney, Agent, or Firm* — Leydig, Voit & Mayer, Ltd.

(57) ABSTRACT

A microscope arrangement includes a plurality of microscopes, and a control device having a display screen and a data link. The display screen is configured to show microscopy data of the microscopes via the data link using display symbols, each display symbol representing microscopy data received by the control device from a different one of the microscopes. In at least one operational state of the control device, the display symbols are moveable on the display screen to correspond to an arrangement of the microscopes.

20 Claims, 3 Drawing Sheets

(51) Int. Cl.
*H04N 7/18* (2006.01)
*G09B 19/00* (2006.01)
*G09B 5/02* (2006.01)

(52) U.S. Cl.
CPC ............... *G09B 5/02* (2013.01); *G09B 19/00* (2013.01); *H04N 7/181* (2013.01)

(56) References Cited

U.S. PATENT DOCUMENTS

| | | | |
|---|---|---|---|
| 2010/0103253 A1* | 4/2010 | Sieckmann | G02B 21/367 |
| | | | 348/79 |
| 2015/0287329 A1 | 10/2015 | Bevenour, Jr. | |
| 2016/0029619 A1* | 2/2016 | Sun | A01N 1/0252 |
| | | | 435/374 |
| 2017/0023784 A1 | 1/2017 | Quintas Glasner De Medeiros et al. | |
| 2018/0011305 A1* | 1/2018 | Castrillon | G02B 21/364 |

\* cited by examiner

MICROSCOPE ARRANGEMENT HAVING A CONTROL DEVICE AND A PLURALITY OF MICROSCOPES, AND METHOD AND CONTROL DEVICE FOR OPERATING A PLURALITY OF MICROSCOPES

CROSS-REFERENCE TO PRIOR APPLICATION

This application is a continuation of U.S. application Ser. No. 15/351,499 filed on Nov. 15, 2016, which is hereby incorporated by reference herein.

FIELD

The invention relates to a microscope arrangement and a method for operating a plurality of microscopes. In particular, the arrangement and method are useable in a learning environment.

Such a microscope arrangement and method can be found particularly in hospitals, schools, universities and other learning institutions, where students are introduced to microscopy techniques. In such an arrangement, each student is assigned a work station which is equipped with a microscope.

BACKGROUND

In order to teach students how to use a microscope and/or to teach how to evaluate probes that are investigated using a microscope, a teacher is usually able to control the individual microscopes centrally.

However, for managing a large number of students and their respective microscopes, a significant amount of time is spent by the teacher in keeping track of which student is associated with which microscope.

SUMMARY

In an embodiment, the present invention provides a microscope arrangement including a plurality of microscopes, and a control device having a display screen and a data link. The display screen is configured to show microscopy data of the microscopes via the data link using display symbols, each display symbol representing microscopy data received by the control device from a different one of the microscopes. In at least one operational state of the control device, the display symbols are moveable on the display screen to correspond to an arrangement of the microscopes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
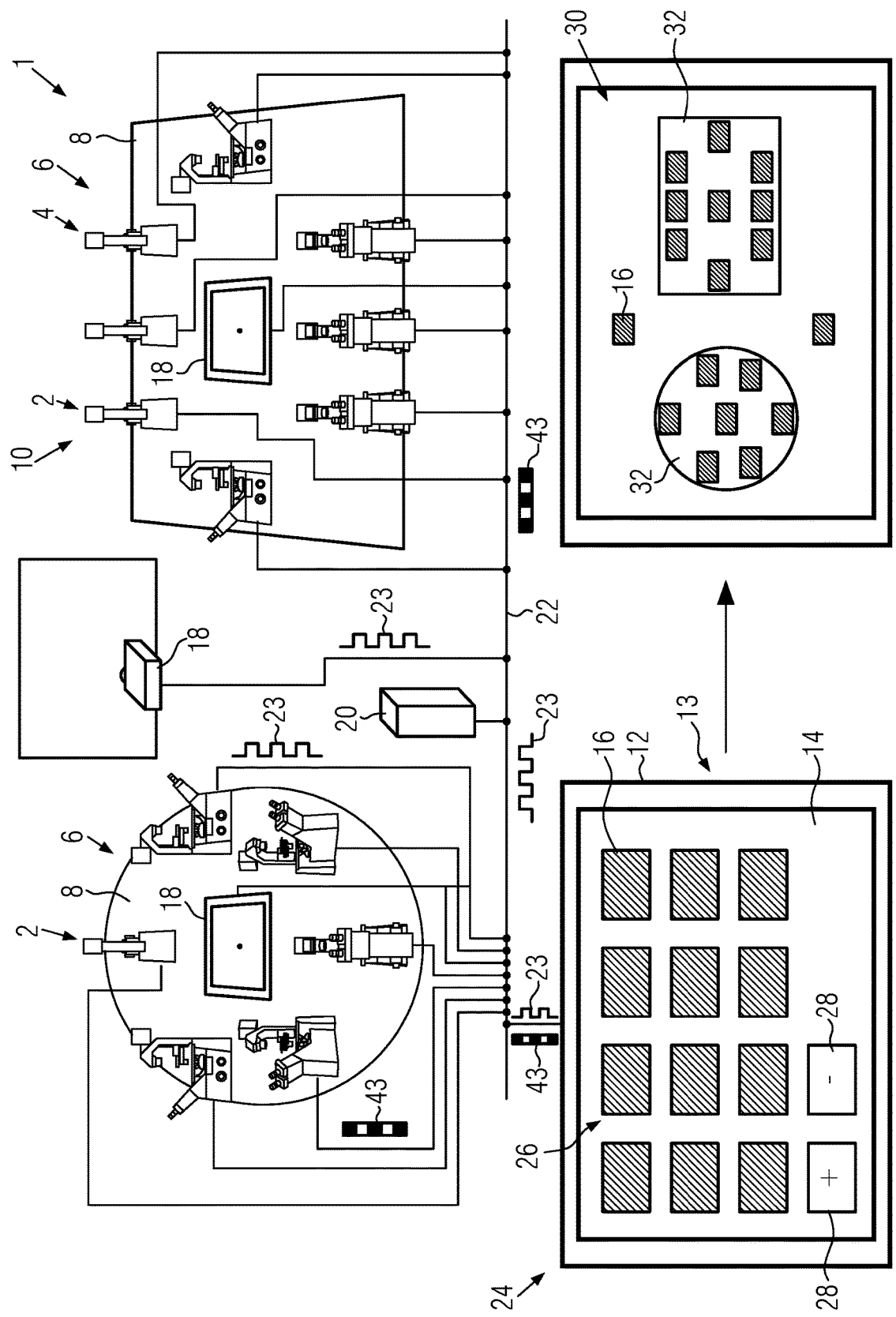
FIG. 1 shows a schematic representation of a microscope arrangement with a display screen before and after adaption to the geometric pattern of the microscope arrangement.

In an embodiment, the present invention provides a microscope arrangement and method for operating a plurality of microscopes, which arrangement and method facilitate the management of the plurality of microscopes by a single person.

A microscope arrangement according to an embodiment of the invention comprises a plurality of microscopes, which are arranged in a geometric pattern, a control device, which has a display screen, and a data link which connects the microscopes to the control device and which is adapted to transfer microscopy data at least from the microscopes to the control device, wherein the display screen comprises display symbols, each display symbol representing microscopic data received by the control device from a different one of the microscopes, and wherein the displayed symbols, in at least one operational state of the method device, are arranged moveably on the screen and are adapted to be moved into the geometric pattern in which the microscopes are arranged.

A method for operating a plurality of microscopes according to an embodiment of the invention includes a plurality of microscopes being positioned in a geometric arrangement, the microscopes being connected to a control device by a data link, the control device comprising a display screen, the display screen displaying symbols, wherein each symbol represents a different one of the plurality of microscopes, and wherein the method comprises the step of interactively moving the symbols on the display screen into a pattern which corresponds to the geometric arrangement of the microscopes.

By allowing to move the symbols into the geometric pattern in which the microscopes are arranged, it is much easier for the teacher to maintain his orientation regarding which microscope is assigned to which symbol on the display screen. This interactively programmable layout is in contrast to the prior art, where the symbols representing the microscopes were unchangeably presented in a rectangular grid pattern and could not be adapted to the actual seating configuration of the students working on the microscopes.

Embodiments of the invention provide further improvements by the following additional features which are each advantageous in their own right and which can be combined arbitrarily in different embodiments.

For example, the control device may include a keyboard and/or a mouse in addition to the display screen. The keyboard and the display screen may be separate units, and, if operated, are adapted to alter the display symbols.

The display screen may be a touch screen and use LCD, LED or electronic paper technology for displaying the display symbols.

The data link may be wired or wireless, or contain a combination of both wired and wireless sections. It may include a data protocol, such as an http-based protocol, which is suitable for transmitting data.

The display symbols may be configured to be activated, e.g. by tapping on them on a touch screen or clicking on them using a keyboard device or a mouse. Upon activation, the symbol may change its appearance. For example, the display symbols may increase the area which it occupies on the display screen upon actuation. For example, upon activation, the display symbol may fill up the whole display screen and display microscopy data of only the microscope associated with the activated symbol.

According to another advantageous embodiment, at least one, several or all of the microscopes may comprise a camera which is configured to capture at least one set of microscopic image data as part of the microscopy data. The microscopic image data may be for example a microscopic image and/or comprise a video data. The microscopic image data are preferably at least part of the display symbol. Specifically, the microscopic image data may be displayed in at least a part of the display symbol. Thus, for the operator of the control device, the momentary image captured which is associated with a particular display symbol may be immediately apparent from the display screen.

The display of the microscopic image data as at least part of the display symbol may be refreshed periodically, e.g. if modified microscopic image data are received by the control device, or if the changes in subsequent microscopic image data exceed a predetermined, programmable threshold value which may be stored in the control device. Thus, the display symbol renders preferably in real time the view of the camera of the associated microscope.

The microscopic image data of at least several of the plurality of microscopes may be displayed simultaneously at least as part of the display symbols representing of microscopes associated with the respective display symbols. Thus, the teacher or operator gains an immediate overview of the operational state of the different microscopes.

According to another embodiment, the microscope arrangement may comprise a display device. The display device may be a separate device, such as a monitor, or it may be integrated into a microscope of the plurality of microscopes. The display device is preferably adapted to receive and display image data, such as, but not restricted to, microscopic image data from the data link under control of the control device. The image data may be in real time, or retrieved from a storage device. The image data may further comprise other image data such as video data, text data, graphic data such as bit map or vector graphics or any combination thereof.

The display device may, particularly if it is a separate display device, be represented by a separate display symbol on the display screen of the control device. The display device may also be a beamer or any other kind of projector.

The control device may be adapted to direct image data via the data link in particular from a source, such as a camera of a microscope or a data storage, to the display device. Thus, any image data can be directed to any microscope to improve the learning experience.

The appearance of the display symbol representing one of the microscopes may depend on microscopy data received by the control device from that microscope via the data link. For example, the appearance of the display symbol may be different in a state where the microscope represented by the display symbol is switched off as compared to when it is switched on.

In another embodiment, the size of the display symbols is preferably continuously adjustable interactively by an operator of the control device. This allows adapting the size of the display symbol to the geometrical pattern of the microscopes and/or the number of microscopes.

At least some of the plurality of microscopes, or at least their cameras, are preferably adapted to receive commands from the control device via the data link and are thus adapted to be remote controlled by the control device.

The method and the microscopic arrangement may use software and/or hardware to implement the above functions.

The control device may comprise a programmable electronic circuit. The method may be carried out by running a programme on such an electric circuit or computer from a non-transitory computer readable medium.

In the following, the invention is exemplarily described with reference to the drawings. In the drawings, elements which correspond to each other with respect to their function and/or design are given the same reference numeral.

The particular combination of features which is shown in the embodiments may be altered depending on the application at hand. For example, as described above, a feature may be added if the technical effect of this feature is needed for a particular application. Conversely, a feature can be omitted if its technical effect is not necessary for a particular application.

First, the design and function of a microscope arrangement 1 according to an embodiment of the invention is described with reference to FIG. 1.

The microscope arrangement comprises a plurality of microscopes 2 that are arranged in a geometric pattern 4.

For example, the microscopes 2 may be arranged in several clusters 6, where each cluster 6 may be associated with a separate work table 8. Each microscope 2 is associated with a work station 10, at which for example a student may work with the microscope 2.

The microscope arrangement 1 further comprises a control device 12, such as a tablet computer, a computer, another microscope or a combination of a keyboard and a monitor. Just for exemplary purposes, the control device 12 in FIG. 1 is shown to be a tablet computer 13.

The control device has a display screen 14, such as an LCD, LED, OLED, electric-paper or CRT screen. In an activated state, such as shown in FIG. 1, the display screen 12 comprises display symbols 16, wherein each display symbol 16 is associated with a different one of the plurality of microscopes 2.

The microscope arrangement 1 may further comprise at least one separate display device 18, such as a monitor, which can be viewed from one or more work stations 10 simultaneously. The display device 18 may also be a beamer.

Further, the microscope arrangement 1 may comprise a computer device 20 which may be a storage device or a computing device and which is separate from the control device 12.

The microscope arrangement 1 also comprises a data link 22 which is only schematically depicted. The data link may comprise a wired or wireless connection between the microscopes 2, the control device 12, the display devices 18 and the at least one computer device 20. The data link 22 is adapted to transfer microscopy data 23 at least uni-directionally from the microscopes 2 to the control device 18, preferably however bi-directionally between all devices 2, 12, 18, 20 connected to the data link 22. The data link 22 may be implemented using wired or wireless technology or a combination of both wired and wireless technology.

Due to the data link 22 and the transfer of microscopic data via the data link 22 to the control device 12, each display symbol 16 may represent a device 2, 18, 20 connected to the data link or, more correctly, represent microscopy data 23 received from this device. The microscopy data 23 are sent via the data link 22.

In FIG. 1, the control device 12 is shown at the left hand side of FIG. 1, the control device 12 is shown in an operational state 24, in which the display symbols are arranged in a rectangular grid 26.

In this operational state 24, display symbols 16 may be added or removed from the display screen 14 using control elements 28 to match the number of devices linked to the data link 22. Further, the size of the display symbols 16 may be changed.

Initially, the arrangement of the display symbols 16 does not correspond to the geometric pattern 4 of the devices 2, 18, 20. This renders it difficult for an operator of the control device 12, usually a teacher, to immediately recognize which of the display symbols 16 is associated to which of the devices 2, 18, 20 on the data link 22.

Thus, the control device 12 is adapted to be configured such that the display symbols 16 are arranged in a pattern 30 which corresponds to the geometric pattern 4 in e.g. the classroom. For this, the display symbols 16 are, at least in the operational state 24, arranged moveable on the display screen and are adapted to be moved into the geometric pattern 4, in which the microscopes 2 and also the other devices 18, 20 are arranged.

This can be done in the embodiment of FIG. 1 by tapping on a display symbol 16 on the touch screen and dragging it to its appropriate place on the display screen 14. The size of the display symbols 16 may be configured to be adjustable to allow a complete rendition of the geometric pattern 4 on the display screen 14. Additional display symbols 32 may be used to represent the clusters 6 and/or to visually enhance the grouping of the work stations 10. The additional display symbols 32 may be configured to be activated and, upon actuation, trigger a data exchange over the data link 22 between the control device 12 and the microscopes 2 of the cluster 6 which is represented by the particular additional display symbol 32. For example, by using an additional display symbol 32, all microscopes 2 in the cluster 6 associated with the additional display symbol 32 may be controlled to receive the same microscopy data 23 from the control device 12. This can e.g. be done by activating the additional symbol 32, e.g. by tapping or clicking the additional symbol 32 and issuing commands via the control device 12 on a subsequent screen.

Figure 2:
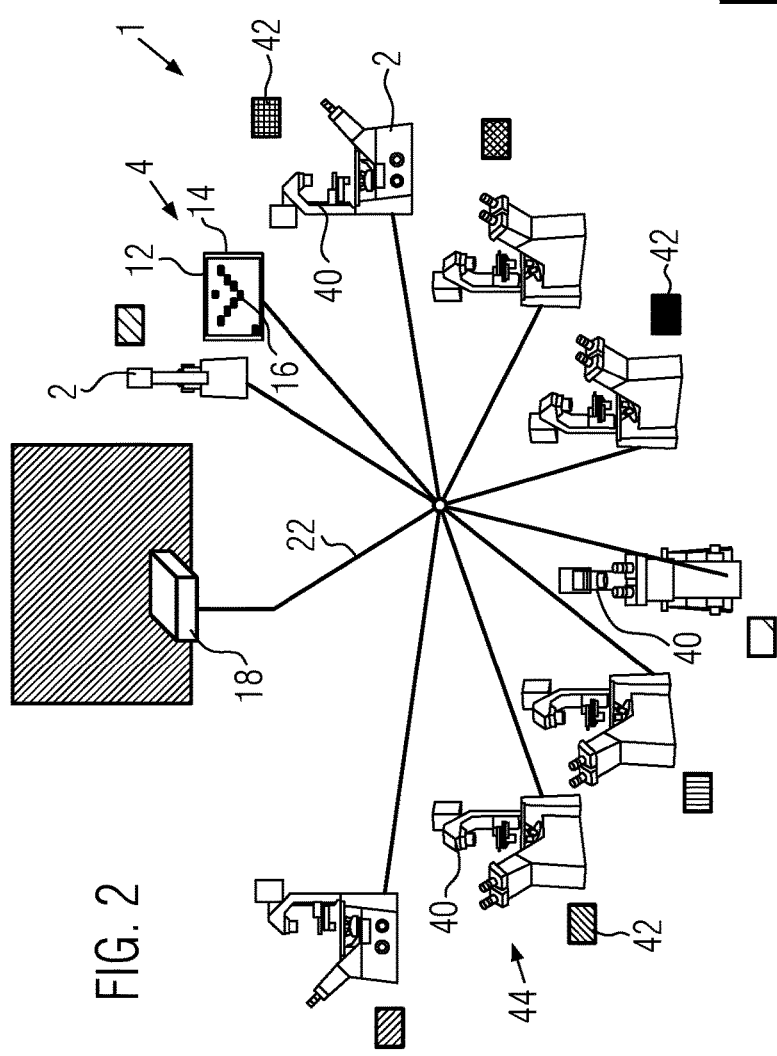
FIG. 2 is a schematic representation of a microscope arrangement operating in one mode.

FIG. 2 shows the control device 12 in a microscope arrangement 1 which comprises a plurality of microscopes 2. The microscopes 2 are arranged in a different geometric pattern 4 than in FIG. 1. The display screen 14 has already been adapted to display the display symbols 16 in the geometric pattern 30 on-screen corresponding to the geometric pattern 4.

At least one microscope 2 is provided with a camera 40 which is adapted to capture microscopic image data 42. The microscopic image data 42 are available on the data link 22. The microscopic image data 42 may be part of the microscopy data 23, or may be the sole constituent of the microscopy data 23. The microscopic image data 42 may comprise still pictures and/or video sequences. The microscopy data 23 may comprise control data 43 which may include an identification tag for a particular microscope 2, or respectively, the camera 40 of this microscope. Upon receipt of control data 43 the microscope associated with the identification tag changes its operational state by performing a microscopy function such as moving a probe table, the field of view, changing brightness and/or color of illumination, and/or a microscopy function, which is solely executed by the camera 40 such as changing the focus, exposure settings and/or focal length.

As is seen in FIG. 2, each camera 40 of the microscopes 2 captures different microscopic image data 42.

Under control of the control device 12, the microscopic image data 42 of a particular microscope 44 which has been selected via the control device may be displayed on a display device 18, such as a beamer.

Figure 3:
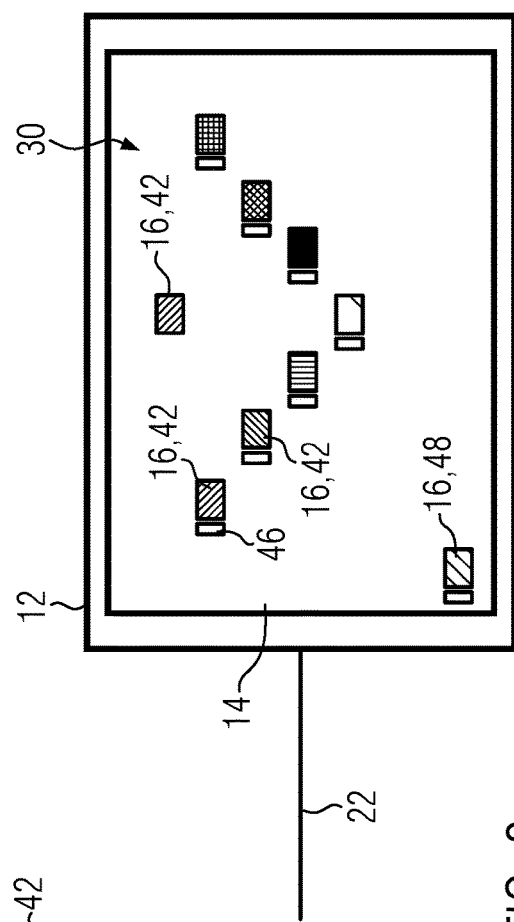
FIG. 3 shows a detail of the microscope arrangement of FIG. 2 operating in another mode.

The control device 12 and its display screen of FIG. 2 are shown enlarged in FIG. 3.

It can be seen that the microscopic image data 42 of a particular microscope 2 are displayed as the and/or as part of the display symbol 16 representing that particular microscope 2 and are arranged in the same position within the pattern 30 on the display screen 14 as that particular microscope 2 in the pattern 4.

The microscopic image data 42 of the various microscopes 2 can be displayed simultaneously on the display screen 14, preferably in real time. Of course, the update time between subsequent updates of the microscopic image data 42 in a display symbol 16 may be changed.

The display symbols 16 represent at least part of the operational state of the microscopes 2. For example, it can be seen that the image data 42 in the display symbol 16 representing the display device 18 (FIG. 2) are the same as the microscopic image data 42 of the microscope 42, if the microscopic image data 42 of the microscope 44 are directed to the display device 18 under control of the control device 12.

The display symbol 16 may comprise a field 46, in which operational parameters of the associated microscope 2 are displayed. Such operational parameters are, for example, the on/off state of the microscope, the current focal length, the state of the light source x-y positions of the microscopic table, aperture and others. The display symbol 16 may also comprise an identifier which is unique to a particular microscope 2.

From FIG. 2 and FIG. 3 it can be seen that the operator of the control device 12 may have been assigned his own microscope 2. A display symbol 16, 48 which is placed at a prominent position such as at a corner, may represent the operator's microscope 2.

At least one, some or all of the plurality of microscopes may comprise a display device 50 which is adapted to display image data 52. The image data 52 comprise microscopic image data 42 as described with reference to FIGS. 2 and 3, or any other image data in any file format, such as bitmaps, vector graphic compressed image data, video sequences, text and combinations thereof.

The display devices 50 of the microscope 2 do not functionally differ from the display devices 18 as described above. The display devices 50 may thus be adapted to receive image data 52 either directly from a camera 40 of the microscope 2 or via the data link 22.

Figure 5:
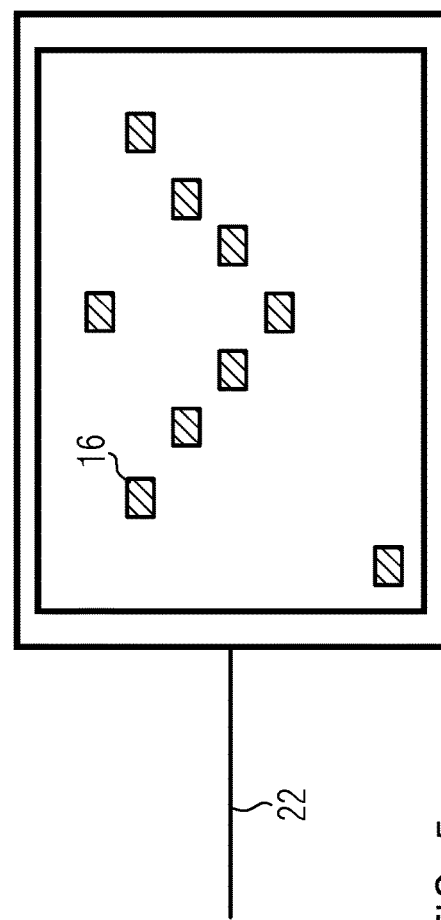
FIG. 5 shows a detail of the microscope arrangement of FIG. 2 operating in another mode.
Figure 4:
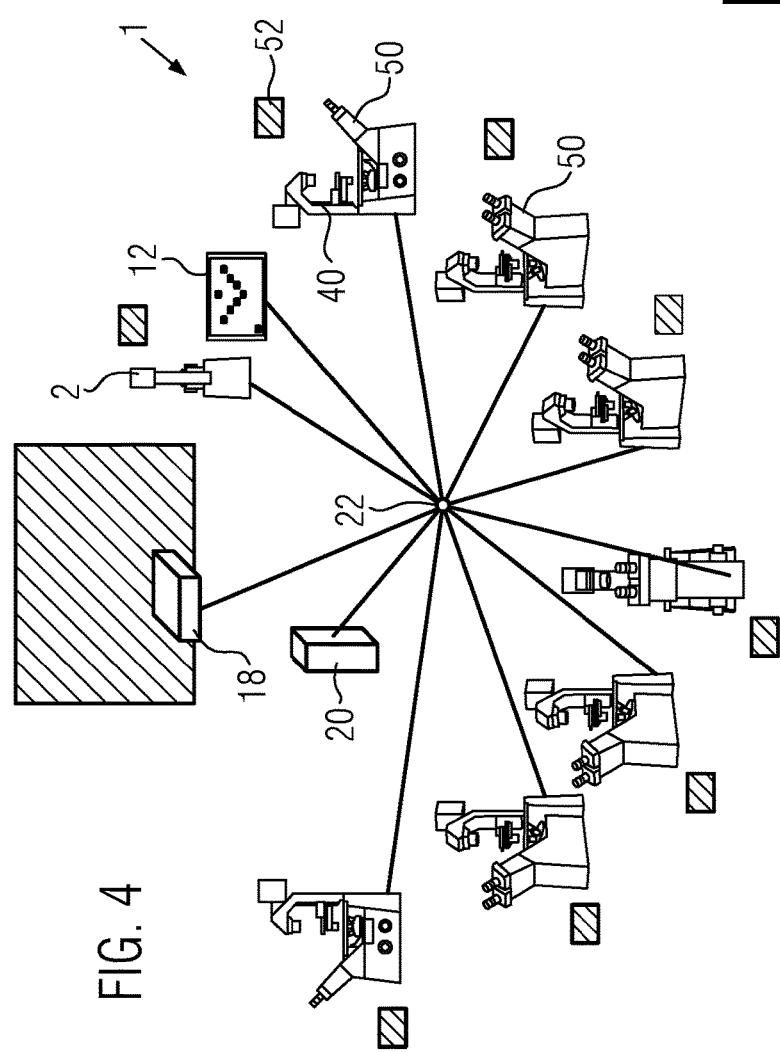
FIG. 4 is a schematic representation of the microscope arrangement of FIG. 2 operating in another mode.

As with the display devices 18, the display devices 52 can be accessed and controlled via the data link by the control device 12. This is exemplarily depicted in FIG. 5 which shows the control device 12 of FIG. 4 in greater detail. Again, the display symbols 16 depict the image data 52 shown at each microscope 2. As can be seen in FIG. 5 in accordance with FIG. 4, all microscopes 2 in the microscope arrangement 1, including the display device 18, show the same image data 52, which may be a particularly noteworthy image captured by a camera 40 of one of the microscopes 2 or an image accessed on a computer or storage device 20 via the data link 22. Again, the display symbols 16 render a real time status not only of the geometric arrangement of the microscope arrangement 1 but also of the image shown on each microscope 2. The display symbols 16 may be individually accessed, e.g. by tapping or clicking to access the images captured by the camera 40 instead of showing the image data shown on the display device 50.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Microscope arrangement
2 Microscope
4 Geometric pattern
6 Cluster
8 Work table
10 Workstation
12 Control Device
13 Tablet computer
14 Display screen
16 Display symbol
18 Display device
20 Computer device
22 Data link
23 Microscopy data
24 Initial state
26 Rectangular grid
28 Control element
30 Geometric pattern on display screen
32 Additional display symbol
40 Camera
42 Microscopic image data e.g. captured by camera
43 Control data
44 Microscope
46 Field of display symbol
48 Display symbol
50 Display device
52 Image data shown on display device

What is claimed is:

1. A microscope arrangement comprising:
   a plurality of microscopes; and
   a control device having a display screen and a data link, the display screen being configured to show microscopy data of the microscopes via the data link using display symbols, each display symbol representing microscopy data received by the control device from a different one of the microscopes,
   wherein, in at least one operational state of the control device, the display symbols are moveable on the display screen to correspond to an arrangement of the microscopes.

2. The microscope arrangement according to claim 1, wherein at least one of the microscopes comprises a camera which is configured to capture at least one set of microscopic image data at least a part of the microscopy data, and wherein the at least one set of microscopic image data is at least part of the display symbol.

3. The microscope arrangement according to claim 2, wherein the microscopic image data of at least three of the plurality of microscopes are displayed simultaneously at least as part of the display symbols associated with the respective microscopes.

4. The microscope arrangement according to claim 2, wherein the microscopic image data comprise video data.

5. The microscope arrangement according to claim 1, wherein the microscope arrangement comprises a display device connected to the data link, and wherein the control device is adapted to direct image data via the data link to the display device.

6. The microscope arrangement according to claim 5, wherein the image data comprise microscopic image data generated by a camera of one of the microscopes.

7. The microscope arrangement according to claim 5, wherein the microscope arrangement comprises workstations, wherein each of the microscopes is assigned to a different workstation, and wherein the display device is separate from the plurality of microscopes, connected to the data link and configured to be observed from at least two of the workstations simultaneously.

8. The microscope arrangement according to claim 1, wherein the arrangement of microscopes the microscopes corresponds to an actual seating arrangement of users of the microscopes.

9. The microscope arrangement according to claim 1, wherein each display symbol is adjustable in size.

10. The microscope arrangement according to claim 1, wherein display symbols are addable or removable from the display screen.

11. The microscope arrangement according to claim 1, wherein the display screen is configured to control a cluster of the microscopes using a further display symbol such that each of the microscopes in the cluster receives the same microscopy data from the control device via the data link.

12. The microscope arrangement according to claim 1, wherein the control data comprises control data including an identification tag which is useable to cause at least one of the microscopes to perform a specified microscopy function.

13. The microscope arrangement according to claim 1, wherein each display symbol includes a field in which operational parameters of the respective microscope are displayed.

14. A method for operating a plurality of microscopes, the method comprising:
   displaying, on a display screen of a control device connected to a plurality of microscopes by a data link, display symbols, each display symbol representing microscopy data of a different one of the microscopes; and
   moving the display symbols on the display screen into an arrangement which corresponds to an arrangement of the microscopes.

15. The method according to claim 14, wherein an appearance of one of the display symbols representing a respective one of the microscopes depends on microscopy image data received by the control device from the respective one of the microscopes.

16. The method according to claim 14, wherein any one of the plurality of microscopes is controllable by the control device to display image data received by a respective one of the microscopes via the data link.

17. The method according to claim 14, wherein a plurality of the display symbols simultaneously display microscopic image data received from the respective microscopes assigned to the respective display symbols.

18. The method according to claim 17, wherein microscopic image data comprising video data from a respective one of the microscopes is displayed in a respective one of the display symbols, and wherein the video data are generated by a camera of the respective one of the microscopes and are displayed in real time.

19. A non-transitory, tangible computer readable medium having instructions thereon which, when executed by a computer having a display screen and a data link to a plurality of microscopes arranged in a geometric pattern, causes the computer to perform the method of operating the plurality of microscopes according to claim 8, wherein the display symbols are moved in response to a user input in at least one operational mode in which the display symbols are moveable by the user on the display screen.

20. A control device for controlling a plurality of microscopes, comprising:
  a data link configured to receive microscopy data from the microscopes; and
  a display screen configured to show microscopy data of the microscopes via the data link using display symbols, each display symbol representing microscopy data received by the control device from a different one of the microscopes,
  wherein, in at least one operational state of the control device, the display symbols are moveable on the display screen to correspond to an arrangement of the microscopes.

* * * * *